(No Model.)

T. JONES.
CRUPPER FOR HARNESS.

No. 310,139. Patented Dec. 30, 1884.

ATTEST.
J. Henry Kaiser.
Chas. P. Janney

INVENTOR.
Thornton his + mark Jones

UNITED STATES PATENT OFFICE.

THORNTON JONES, OF LEESBURG, VIRGINIA, ASSIGNOR TO EWELL B. ATWELL AND THOMAS B. NORRIS, BOTH OF SAME PLACE.

CRUPPER FOR HARNESS.

SPECIFICATION forming part of Letters Patent No. 310,139, dated December 30, 1884.

Application filed October 25, 1884. (No model.)

*To all whom it may concern:*

Be it known that I, THORNTON JONES, a citizen of the United States, residing at Leesburg, in the county of Loudoun and State of Virginia, have invented a new and useful Improvement in Harness-Cruppers, of which the following is a full, clear, and exact description, sufficient for those skilled in the art to make and use my invention.

My invention relates to improvements in cruppers for harnesses, saddles, &c., and the design of my improvement is to provide a simple means which may be employed in breaking and training young horses, in curing vicious horses of refractory habits, especially kicking, rearing, and plunging, and particularly in securing a graceful style in the carriage of the tail. I attain this object by means of the crupper shown in the accompanying drawings, in which I have illustrated the same.

Figure 1:
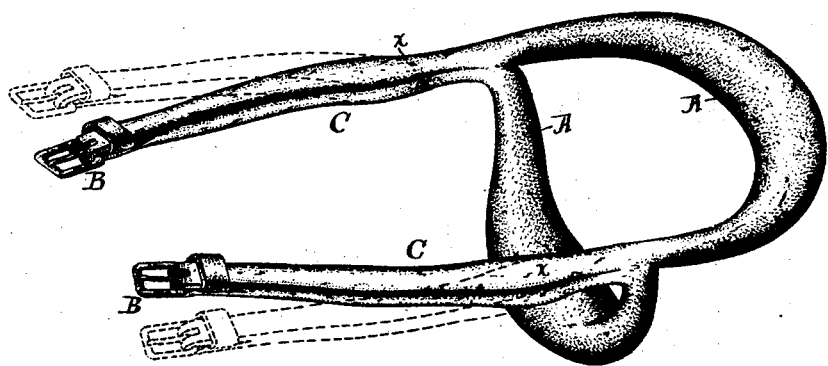
Figure 2:

Figure 1 shows a perspective view, and Fig. 2 a detail.

The ordinary crupper passes beneath the horse's tail in a single loop or bow, and buckles at each of its extremities to the bifurcated termination of the back-strap leading to the riding-saddle, or to the saddle of the harness carrying the girth-straps. For riding or driving trained horses this crupper answers every purpose, serving to retain the saddle or harness in place and affording secure means for keeping the same upon the body of the horse. My improved crupper, however, instead of having the usual single loop, is formed with two rigid loops, A A, spread apart from each other at a sufficient distance to compel the tail of the horse, beneath which it is adjusted, to be carried out in a straight or even arched line continuous with the line of the spinal column of the animal. This is accomplished by joining the two loops at their extremities rigidly to each other at an angle of from thirty to forty or forty-five degrees, as may be best adapted for the use to which it is to be put. A simple and inexpensive means to secure this rigidity is a frame of light metal, having the necessary form, and continuing, after the junction of the two loops or bows, in a single extension each, C C, to the bifurcated back-strap, where the extensions terminate in buckles B B. For convenience, however, in attaching and removing the crupper, a hinge-joint is made in each extension of the frame, at $x\, x$, as shown in Fig. 2. This hinge operates laterally, as shown in dotted lines, Fig. 1, but not vertically. The frame thus formed is covered with leather or other suitable material, in usual form. If needful, stuffing or padding may be inserted to give the requisite fullness or "swell" at the desired points upon the loops. If desirable, the junction of the loops at their extremities may be adjustable, so that the two loops forming the crupper may be set farther or nearer each to the other. This is not important, however. Besides, the device being so cheaply made, it is better to have several in stock, made of varying degrees of width, to suit different animals.

I have found this crupper of great value in breaking young horses and in training refractory and vicious horses whose habits have been long formed. It is well known to those having experience with kicking horses that such animals are not apt to kick unless they can first shut the tail down tightly. If by any means this preliminary preparation is prevented, the kick is generally obviated. Moreover, horses wearing my improved crupper can not flirt the tail over and clamp the reins, either one or both, beneath the same, which, when the driver attempts to draw out, is frequently the cause of a runaway accident.

Another important advantage is the greatly improved carriage and style given to an animal wearing this improved device; and when once accustomed to its use the animal rarely will require to wear other than the ordinary crupper.

What I claim as my invention, and desire to secure by Letters Patent of the United States, is—

1. The herein-described crupper, having the customary loop, and provided with a supplemental loop at an angle thereto, as set forth.

2. The herein-described crupper, having the customary loop rigidly supporting the supplemental loop at an angle thereto, in combination with the hinged extensions, as set forth.

his
THORNTON + JONES.
mark.

Witnesses:
CHAS. P. JANNEY,
CHAS. L. POLLORK.